United States Patent
Webb et al.

(10) Patent No.: US 10,978,876 B2
(45) Date of Patent: Apr. 13, 2021

(54) MAXIMUM POWER POINT TRACKING HYBRID CONTROL OF AN ENERGY STORAGE SYSTEM

(71) Applicant: GENERAL ELECTRIC COMPANY, Schenectady, NY (US)

(72) Inventors: Joshua Webb, Schenectady, NY (US); Kenneth Rush, Schenectady, NY (US); Luca Tonini, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/614,033

(22) PCT Filed: May 25, 2018

(86) PCT No.: PCT/US2018/034662
§ 371 (c)(1),
(2) Date: Nov. 15, 2019

(87) PCT Pub. No.: WO2018/222536
PCT Pub. Date: Dec. 6, 2018

(65) Prior Publication Data
US 2020/0176988 A1 Jun. 4, 2020

Related U.S. Application Data

(60) Provisional application No. 62/512,313, filed on May 30, 2017.

(51) Int. Cl.
*H02J 3/32* (2006.01)
*H02J 7/00* (2006.01)
(Continued)

(52) U.S. Cl.
CPC ............... *H02J 3/32* (2013.01); *H02J 3/381* (2013.01); *H02J 7/005* (2020.01); *H02J 7/0013* (2013.01);
(Continued)

(58) Field of Classification Search
CPC .. H02J 3/32; H02J 7/0048; H02J 7/005; H02J 3/381; H02J 7/0013; H02J 7/35;
(Continued)

(56) References Cited

U.S. PATENT DOCUMENTS 8,279,644 B2 10/2012 Zhang et al.
9,218,035 B2 12/2015 Li et al.
(Continued)

FOREIGN PATENT DOCUMENTS

CN 100463332 C 2/2009
CN 102593864 A 7/2012

OTHER PUBLICATIONS

Australian First Examination Report dated Jun. 23, 2020 which was issued in connection with Australian Patent Application 2018278210.
(Continued)

*Primary Examiner* — Robert L Deberadinis
(74) *Attorney, Agent, or Firm* — Buckley, Maschoff & Talwalkar LLC

(57) ABSTRACT

Controlling an energy storage system includes accessing monitored sensor data and component data, if the DC bus voltage is less than the renewable energy power module (REPM) output voltage then selecting battery modules in combination with a power-network inverter to source power to the bus, else if greater than the REPM voltage then selecting battery modules in combination with the inverter to sink power from the bus, instructing respective control processors of the selected battery modules and a control processor of the inverter to either source/sink power respec-
(Continued)

tively to/from the DC bus, accessing updated DC bus voltage and updated REPM output voltage, and if the DC bus voltage and the REPM output voltage are about equal, then periodically accessing sensor data and component data, else reselecting and reinstructing the battery modules in combination with the inverter. A system for implementing the method and a non-transitory computer-readable medium are also disclosed.

18 Claims, 4 Drawing Sheets

(51) Int. Cl.
  *H02J 3/38* (2006.01)
  *H02J 7/35* (2006.01)

(52) U.S. Cl.
  CPC .............. *H02J 7/0048* (2020.01); *H02J 7/35* (2013.01); *H02J 2300/26* (2020.01); *H02J 2300/28* (2020.01)

(58) Field of Classification Search
  CPC ...... H02J 2300/28; H02J 2300/26; H02J 3/38; H02J 7/00
  See application file for complete search history.

(56) References Cited

U.S. PATENT DOCUMENTS

| | | | |
|---|---|---|---|
| 9,331,499 | B2 | 5/2016 | Ikriannikov et al. |
| 2009/0078300 | A1 | 3/2009 | Ang et al. |
| 2013/0106194 | A1 | 5/2013 | Jergovic et al. |
| 2015/0349533 | A1 | 12/2015 | Feuerstack |
| 2016/0156220 | A1 | 6/2016 | Kaag |

OTHER PUBLICATIONS

Park et. al.: "Intelligent Control for a Distributed Flexible Network Photovoltaic System Using Autonomous Control and Agent", Electronics and Communications in Japan, Scripta Technica, New York, US, vol. 96, No. 1, Jan. 1, 2013.

International Search Report and Written Opinion dated Aug. 10, 2018 which was issued in connection with PCT/US18/034662 which was filed on May 25, 2018.

Moradi et. al.: "A hybrid maximum power point tracking method for photovoltaic systems", Solar Energy, Nov. 2011, vol. 85 Issue: 11 pp. 2965-2976.

European Office Action dated Nov. 30, 2020 which was issued in connection with a counterpart application.

Sangsoo Park et. al.: Intelligent control for a distributed flexible network photovoltaic system using autonomous control and agent: Electronics and Communications in Japan, Script Technica, New York, US vol. 96, No. 1, Jan. 1, 2013 pp. 14-24.

Lie Xu et. al.: Control and operation of a DE Microgrid with Variable Generation and Energy Storage IEEE Standard,, IEEE, Piscataway NJ US Jan. 1, 2011 p. 1.

MAXIMUM POWER POINT TRACKING HYBRID CONTROL OF AN ENERGY STORAGE SYSTEM

CLAIM OF PRIORITY

This patent application claims the benefit of priority, under 35 U.S.C. § 119, of U.S. Provisional Patent Application Ser. No. 62/512,313, filed May 30, 2017, titled "ENERGY STORAGE SYSTEM WITH MPPT FUNCTION" the entire disclosure of which is incorporated herein by reference.

BACKGROUND

The worldwide demand for electrical energy has been increasing year by year. Most of the electrical energy demand is met by energy produced from conventional energy sources such as coal and gas. However, in recent years, with the rising global climate change issues, there has been a push for electricity generation by renewable energy resources such as solar power and wind power.

Wind turbine generators are regarded as environmentally friendly and relatively inexpensive alternative sources of energy that utilize wind energy to produce electrical power. Further, solar power generation uses photovoltaic (PV) modules to generate electricity from the sunlight. Since the intensity of wind and sunlight is not constant the power output of wind turbines and PV modules fluctuate throughout the day. Unfortunately, the electricity demand does not vary in accordance with solar and wind variations.

An energy storage system may help to address the issue of variability of solar and wind power at a small scale. Essentially, the variable power from solar and wind power plants can be stored in the energy storage system which can then be used at a later time or at a remote location. Energy storage systems may also be charged from a power network and could be used to address the frequency variations, harmonic suppression, voltage support and power quality in the power network.

When PV modules are connected to the energy storage system it is desirable to fetch maximum power from the PV modules. Therefore, a system and a method that will address the foregoing issues is desirable.

DRAWINGS

These and other features and aspects of embodiments will become better understood when the following detailed description is read with reference to the accompanying drawings in which like characters represent like parts throughout the drawings, wherein.

DETAILED DESCRIPTION

Embodying systems and methods generally provide control of an energy storage system and, more specifically, provide Maximum Power Point Tracking (MPPT) function in the energy storage system. Conventional approaches to providing MPPT function rely on utilizing a grid-side inverter to control direct current (DC) bus levels. Embodying systems and methods can implement an MPPT function by controlling the operation of one or more power converters that sink/source power between one or more respective storage batteries and the DC bus, and controlling the operation of the grid-side inverter.

Figure 1:
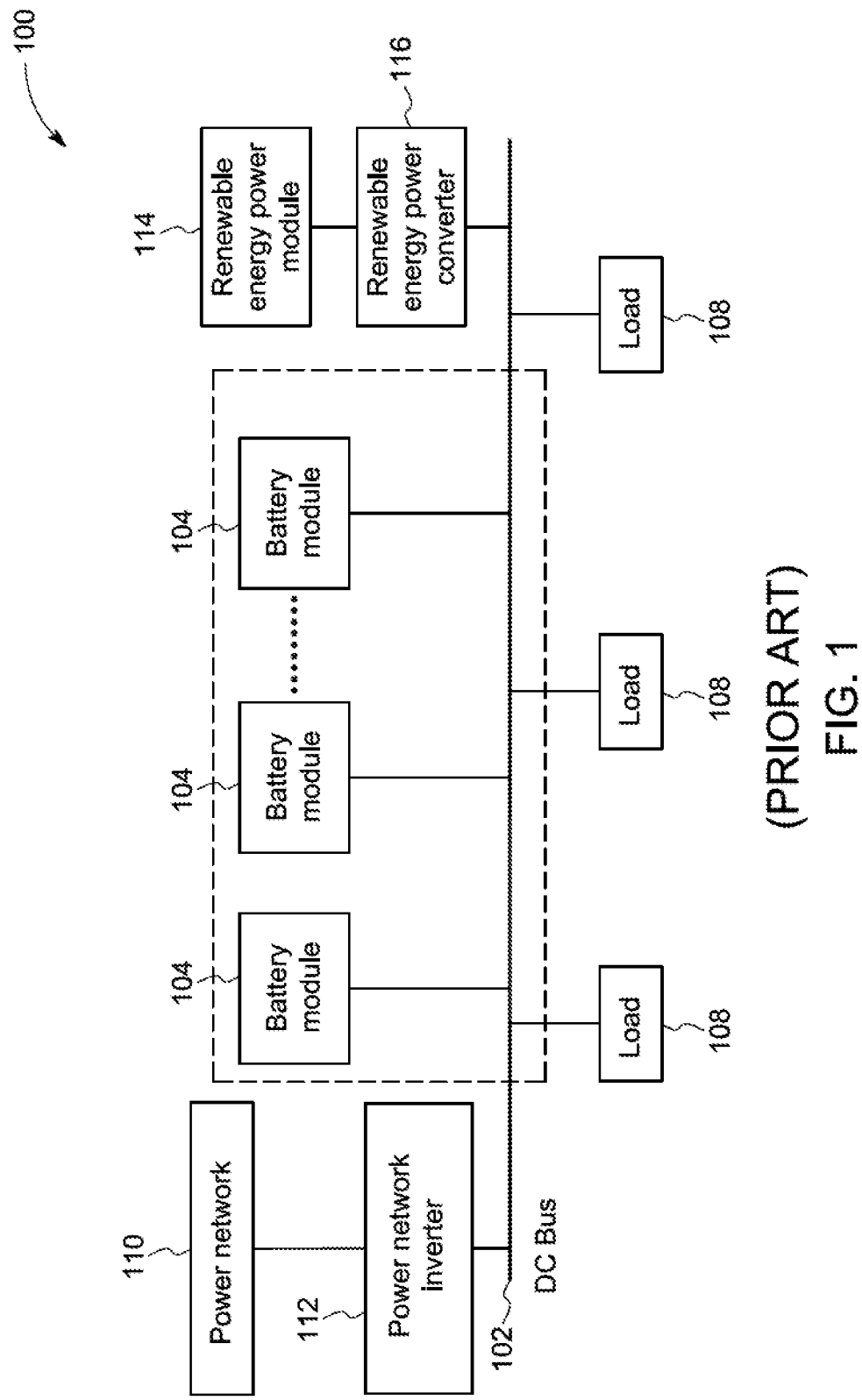
FIG. 1 illustrates a schematic diagram of a conventional energy storage system.

FIG. 1 illustrates conventional energy storage system 100, which includes DC bus 102. A plurality of battery modules 104 is connected to the DC bus. Each of the plurality of battery modules includes a battery having a plurality of battery cells connected in series and/or parallel, and at least one power converter connected between the battery and the DC bus.

The power converters connected to the battery modules can facilitate transfer of energy from one battery module 104 to another battery module 104 and/or from one battery cell to another battery cell within one battery module 104. The batteries in each battery module 104 may get charged from the DC bus, and/or may provide energy to loads 108 connected to the DC bus. Loads 108 can include a car charger, electric drives, lighting loads etc. When a particular load is an alternating current (AC) load a DC-to-AC converter may be used between the DC bus 102 and the AC load(s). Energy storage system 100 can also include other components such as a controller, a communication module, and a protection module.

In some implementations energy storage system 100 may be connected to AC power network 110 via a power network-side inverter 112. The power network can be a consumer, commercial, and/or utility scale power network. In some implementations the energy storage system may also be connected to renewable energy power module 114, which can generate energy from one or more renewable energy generation sources (e.g., photovoltaic (PV) panels, wind turbines, geothermal exchanges, or any other renewable energy generation source). The renewable energy power module 114 is connected to the energy storage system via renewable energy power converter 116.

By controlling the DC bus voltage, batteries 104 may be charged from power network 110 and renewable energy power module 114. Moreover, in implementations the batteries in the battery module 104 may supply power to the power network. Further, the renewable energy power converter 116 can be controlled such that maximum power is fetched from the renewable energy power module 114.

Figure 2:
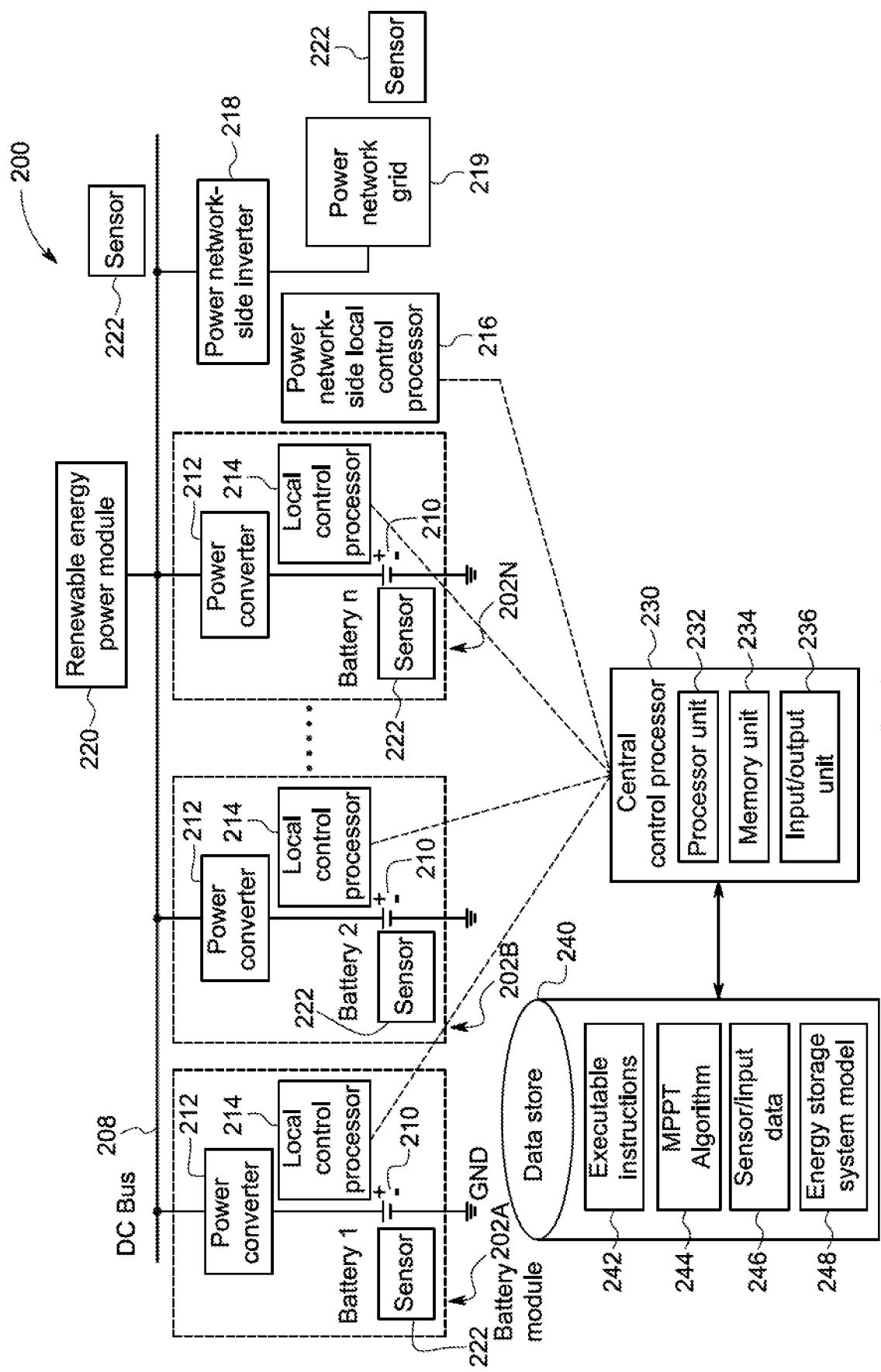
FIG. 2 illustrates an energy storage system in accordance with embodiments.

FIG. 2 illustrates energy storage system 200 in accordance with embodiments. Energy storage system 200 can include a plurality of battery modules 202A, 202B, . . . , 202N coupled to DC bus 208. Each of battery modules 202A, 202B, 202N include a respective battery 210, respective power converter 212, and respective local controller 214. In accordance with embodiments, power converters 212 can be bidirectional devices that either source and/or sink current from the battery module. In some configurations, a single power converter can be located between the DC bus and more than one (or all) battery modules.

Power network grid 219 can be in electrical communication with DC bus 208 through power network-side inverter 218. The power network-side inverter can either source power to DC bus 208 from the power network, or provide power from the DC bus to power network grid 219. Power network-side local controller 216 is provided for control of power network-side inverter 218.

Renewable energy power module 220 contains one or more renewable energy generators. The renewable energy power module can be coupled to DC bus 208. Renewable energy power module 220 can be in direct electrical communication with the DC bus 208 (as shown). In some implementations (e.g., where the renewable energy drives a turbine—hydro, wind, etc.), the renewable energy power module can be coupled to the DC bus through a renewable energy power inverter (AC-DC conversion) to set the DC bus level from the renewable energy power source.

Renewable energy power module 220 can provide about its maximum possible power to DC bus 208. The maximum power that can be generated is dependent on factors related to the nature of the renewable energy (e.g., wind speed/duration, ambient temperature, sunlight intensity, etc.). However, the maximum possible power that can be transferred from renewable energy power module 220 to the DC bus depends on the relationship between the DC bus voltage level and the output voltage of power module 220.

In accordance with embodiments, the DC bus voltage is controlled to about match the power module output voltage to about maximize power transfer to the DC bus. In the conventional implementation illustrated in FIG. 1, because renewable energy power converter 116 provides a buffer between the output terminal of renewable energy power module 114 and DC bus 102, the entire DC bus voltage need not be controlled. Thus, the conventional approach is to use renewable energy power converter 116 to control only the voltage at the output terminal of the renewable energy power module 114.

With reference again to FIG. 2, a renewable energy power converter is not positioned between the renewable energy source and the DC bus (as is done in conventional systems). In accordance with embodiments, control of the DC bus voltage level to realize about maximum power transfer from the renewable energy power module to the DC bus can be achieved by controlling voltage outputs from a respective power converter 212 of one or more respective battery module 202A, 202B, . . . , 202N, and/or the output voltage of power network-side inverter 218—either in coordination or individually.

Central controller 230 includes input/output unit 236, through which the central controller is in communication with respective local controllers 214 of respective battery modules, and also in communication with power network-side local controller 216. In accordance with embodiments to effectuate control of the DC bus voltage, the central controller can provide control command signals tailored to each local controller. These commands can instruct the local controller to adjust an output voltage of respective power converter 212. The communication from central controller to local controllers could be digital communication. In accordance with implementations, communication can be wireless, or wired, and can include various protocols—e.g., RS232 communication, Bluetooth, WIFI, ZigBee, TCP/IP, etc. Central controller 230 can include memory unit 234 for local memory and/or cache operations.

Central controller 230 and each of local controller 214, 216 can be a control processor implemented as a programmable logic device (e.g., a complex programmable logic device (CPLD), field programmable gate array (FPGA), Programmable Array Logic (PAL), a microcontroller, application-specific integrated circuit (ASIC), etc.).

Central controller 230 can be in communication with data store 240 across an electronic communication network, or be in direct connection with the data store. The central controller can include processor unit 232 which executes executable instruction 242 to cause the control unit to perform MPPT algorithm 244 in accordance with embodiments.

In accordance with embodiments, the central controller 230 determines whether one or more of power converters 212, or whether power network-side inverter 218, or whether a combination of the power converter(s) and the inverter should control the DC bus voltage. This determination can be based MPPT algorithm 244 applying sensor/input data 246 to energy storage system model 248. The model can include component function characteristics, system operational functions, renewable energy power module power/voltage output curve, and other parameters. One example of component function characteristic input data residing in sensor/input data 246 (i.e., component data) can be a battery's capability for handling the charge/discharge cycle—e.g., the robustness of the battery's expected degradation curve. By applying the sensor reading data and the component data of sensor/input data 246 to the model, the MPPT algorithm can provide a snapshot of the system status. Variation of the input data to the algorithm can provide a prediction of the system operation.

Sensor/input data 246 can include sensor reading data obtained from one or more local controllers 214, 216. The local controllers can monitor one or more sensors 222 located in various locations of energy storage system 200. The sensors can monitor, dynamically sense, and/or measure data such as, but not limited to, battery module operation (and its components—power converter, battery operating conditions), the DC bus voltage, power network conditions, environmental conditions (e.g., sunlight intensity, temperature, wind speed, etc.). Battery operating conditions can include, battery age, detection of battery fault(s), battery temperature, etc. The local controller and/or the central controller can analyze the collected sensor data and component input data to determine if a battery has different operating characteristics compared to other batteries and/or the battery characteristics of model 248, whether a battery needs to be charged or discharged, etc. Determinations based on the sensor/input data and MPPT algorithm can determine whether the power should be fed, or pulled, to/from the power network grid.

Local controller 214, 216 can include a processor unit, memory unit, input/output unit, executable instructions stored in the memory unit. In some implementations the local controller can also include an analog-to-digital converter to convert received analog signals (from, perhaps, sensors), a user interface (e.g., visual display, printer, etc.) that can indicate current status or other information and parameters. The local controller may also include a digital to analog converter for converting digital signals into analog signals to control the power converters.

Figure 3:
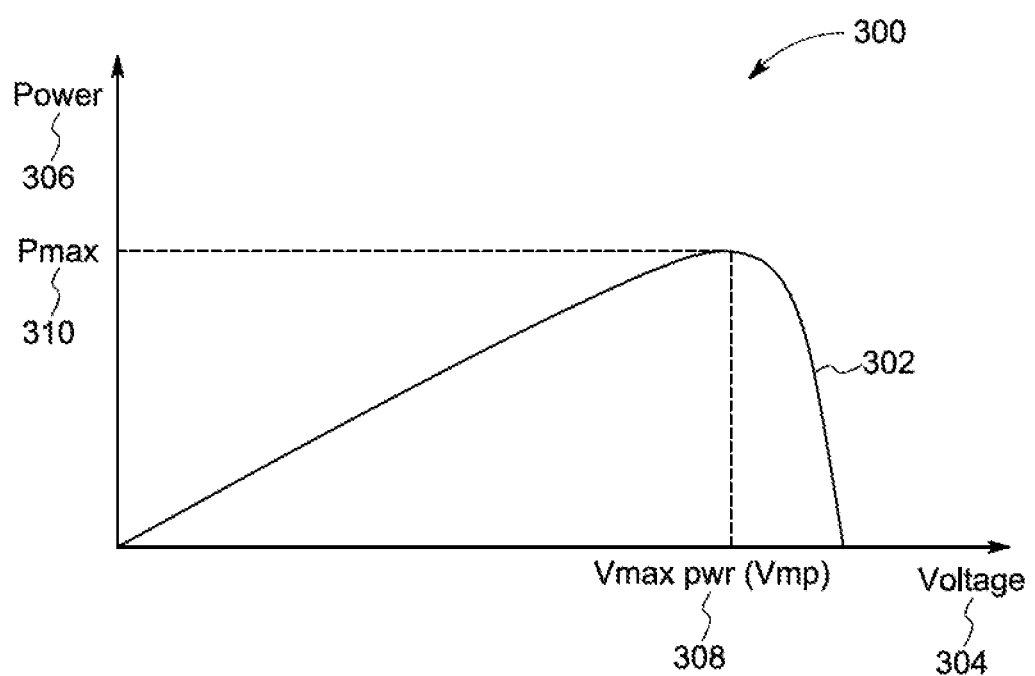
FIG. 3 illustrates a graphical plot depicting an exemplary power/voltage output curve of a photovoltaic module.

FIG. 3 illustrates graphical plot 300 depicting exemplary power/voltage output curve 302 of a photovoltaic module. For purposes of discussion only a PV module curve is depicted. It should be readily understood that this disclosure can be applied to other devices with different power/voltage output curves. Horizontal axis 304 represents an output terminal voltage of a PV module of a solar power module. Vertical axis 306 represents output power of the PV module. When the output terminal voltage of the PV module is at Vmp 308, the maximum power is generated—i.e., Pmax 310. Because the output terminal of renewable energy power module 220 is at the same potential as the DC bus, the DC bus needs to be at Vmp to achieve maximum power transfer from the renewable energy source to the DC bus. MPPT algorithm can determine which of power converters 212 and/or power network-side inverter 218 is to be adjusted to set the DC bus voltage to match Vmp. Adjustment of the power converters and network-side inverter is controlled by one or more command signals from central controller 230 to one or more local controllers 214, 216.

As should be readily understood, Vmp 308 can vary because power/voltage output curve 302 itself can vary dependent on ambient, environmental conditions (e.g., temperature, wind speed and/or sunlight intensity, etc.). Therefore, the DC bus voltage is varied accordingly. A variation in the DC bus voltage will be seen by loads connected to the DC bus. However, loads that include a DC-to-DC converter as a buffer between the DC bus and the load will be able to maintain a constant load by controlling the DC-to-DC converters.

Figure 4:
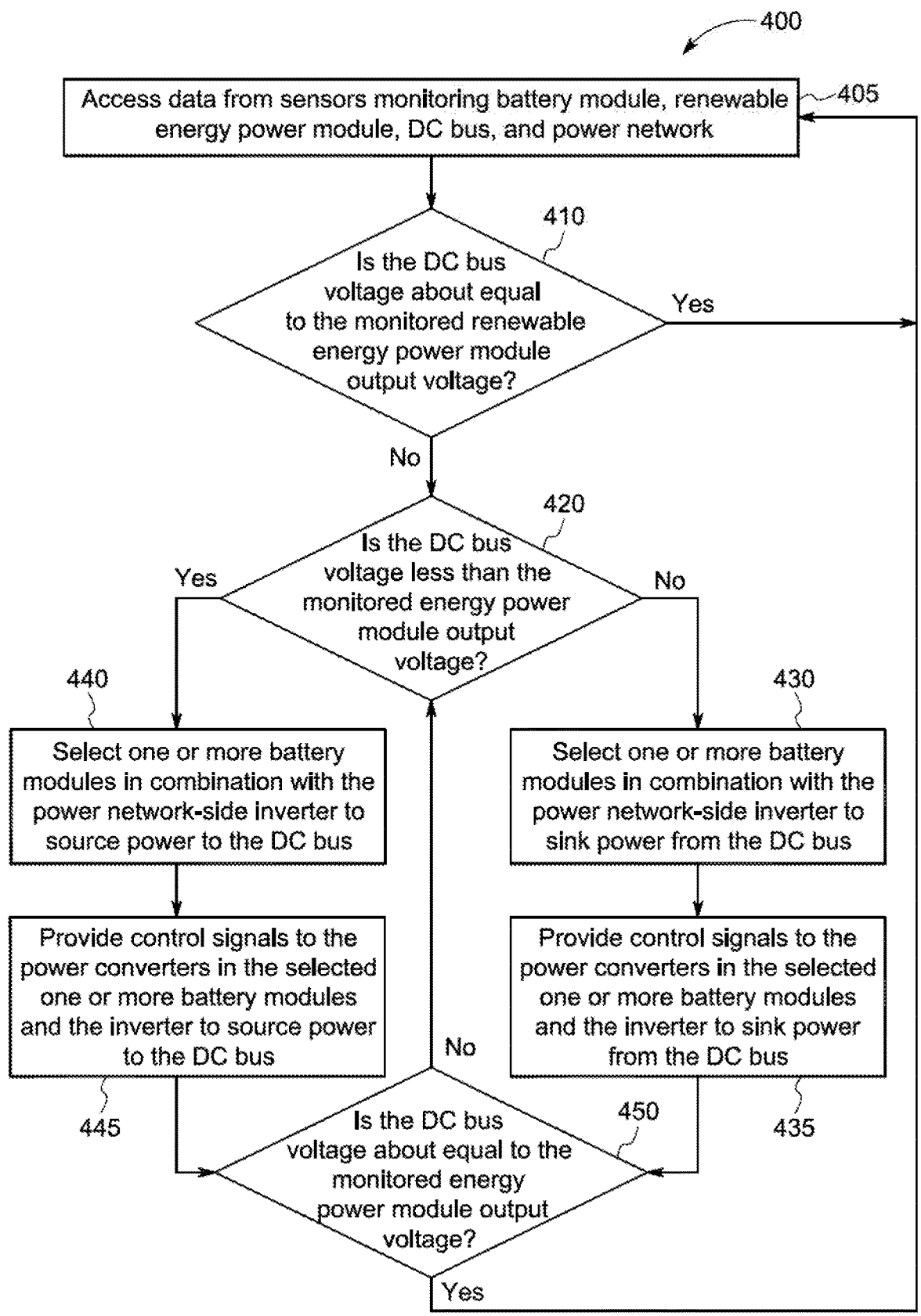
FIG. 4 illustrates a process to control the system of FIG. 2 to perform MPPT in accordance with embodiments.

FIG. 4 illustrates process 400 that can implement MPPT algorithm 244 on energy storage system 200 in accordance with embodiments. Data is accessed, step 405, from multiple sensors 222 distributed at various locations of the energy storage system. Data can be accessed from data store records, or received from sensors in communication with the central controller through a local controller. Dependent on location, the sensors can be monitoring output voltage and/or current, battery condition and/or characteristics, battery charge level, component status (battery module, renewable energy power module, power network grid, etc.). Data can also include input data on component conditions/characteristics/and/or other parameters.

A determination is made, step 410, whether the DC bus voltage (as received from a sensor) is about equal to the monitored output voltage of renewable energy power module 220. As should be readily understood, the conditional term "about" is used due to the real-world inability to obtain a precise, absolute measurement. The preciseness of the measurement can be impacted by each sensors' accuracy/resolution/and/or repeatability, analog-to-digital and digital-to-analog conversion losses, etc.

If the voltages are about equal a maximum power transfer condition exists, and Process 400 returns to step 405. If the voltages are not about equal, the MPPT algorithm determines control commands which are sent to one or more local controllers 214, 216 from central controller 230. These control commands configure battery module(s) in combination with power network-side inverter 218 to either source and/or sink power to/from DC bus 208 to achieve a MPPT condition.

A determination is made whether the DC bus voltage is less than the monitored power, step 420. If the monitored DC bus voltage is less than the monitored renewable energy power module voltage, Process 400 continues to step 440; else Process 400 continues to step 430.

At step 430, one or more battery modules is selected in combination with the power network-side inverter to sink power from the DC bus. The battery module selection is based on a prediction of system performance made using energy storage system model 248 to incorporate sensor/input data records 246 accessed by MPPT algorithm 244. This input data can include, but is not limited to, the status of battery module parameters and/or characteristics received from the sensors and other input data (component specific parameters, specifications, etc.). For example, battery charge/discharge rates, battery age, battery capacity, battery fault indication, battery charge levels, power network grid conditions, and other information/conditions/characteristics/parameters can be used by MPPT algorithm 244 in energy storage system model 248. In some implementations, input data for the selection of the one or more battery modules can include expected and/or measured impedance differences between the renewable energy power module distribution system and battery modules. After selection of the one or more battery modules is made, command control signals are provided, step 435, to respective local controllers 214 that control the selected one or more battery modules 202A, 202B, . . . , 202N and to the power network-side local controller 216.

At step 440, one or more battery modules is selected in combination with the power network-side inverter to source power to the DC bus. The selection of battery modules is based on the status of battery module parameters and/or characteristics received from the sensors. For example, battery charge/discharge rates, battery capacity, battery charge levels, power network grid conditions, and other parameters from sensor/input data 246 can be used by MPPT algorithm 244 in energy storage system model 248. After selection of the one or more battery modules is made, command control signals are provided, step 445, to respective local controllers that control the one or more battery modules and to the power network-side inverter.

At step 450, a determination is made whether the DC bus voltage (as received from a sensor) is about equal to the monitored output voltage of renewable energy power module 220. If the voltages are about equal a maximum power transfer condition exists, and Process 400 returns to step 405. If the voltages are not about equal, Process 400 returns to step 420 to repeat steps 420-450 in a loop.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method to provide MPPT control of an energy storage system, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method of controlling an energy storage system comprising:
accessing sensor data from sensors monitoring the energy storage system and accessing component data for one or more components of the energy storage system, the sensor data including monitored voltage of a DC bus and monitored output voltage of a renewable energy power module (REPM);
if the DC bus voltage is less than the REPM output voltage then selecting one or more battery modules of the energy storage system in combination with a power-network inverter in electrical communication with the DC bus to source power to the DC bus;
else if the DC bus voltage is greater than the REPM output voltage then selecting one or more battery modules of the energy storage system in combination with the power-network inverter to sink power from the DC bus;
instructing a respective control processor in communication with each of the one or more selected battery modules and a control processor in communication with the power-network inverter to either source or sink power respectively to or from the DC bus;
accessing updated DC bus voltage and updated REPM output voltage; and
if the DC bus voltage and the REPM output voltage are about equal, then periodically accessing the sensor data and the component data, else reselecting and reinstructing one or more of the battery modules in combination with the power-network inverter to either source or sink power respectively to or from the DC bus.

2. The method of claim 1, the selecting one or more of the battery modules including:
obtaining a prediction of system performance by applying the accessed sensor data and the accessed component data to a model of the energy storage system;
determining the selection of the one or more battery modules based on the system performance prediction; and
identifying the selected one or more battery modules to a first control processor in communication with each of the respective control processors.

3. The method of claim 2, the model including one or more of component function characteristics, system operational functions, and a power/voltage output curve for the renewable energy power module.

4. The method of claim 1, the component data including one or more of a battery charge/discharge rate, a battery age, and a battery capacity.

5. The method of claim 1, the sensor data including one or more of a battery module output voltage and/or current, a battery condition, a battery charge level, a battery fault indication, and a power network grid status condition.

6. The method of claim 1, the accessing sensor data including receiving data from the sensors.

7. A non-transitory computer-readable medium having stored thereon instructions which when executed by a processor cause the processor to perform a method of controlling an energy storage system, the method comprising:
accessing sensor data from sensors monitoring the energy storage system and accessing component data for one or more components of the energy storage system, the sensor data including monitored voltage of a DC bus and monitored output voltage of a renewable energy power module (REPM);
if the DC bus voltage is less than the REPM output voltage then selecting one or more battery modules of the energy storage system in combination with a power-network inverter in electrical communication with the DC bus to source power to the DC bus;
else if the DC bus voltage is greater than the REPM output voltage then selecting one or more battery modules of the energy storage system in combination with the power-network inverter to sink power from the DC bus;
instructing a respective control processor in communication with each of the one or more selected battery modules and a control processor in communication with the power-network inverter to either source or sink power respectively to or from the DC bus;
accessing updated DC bus voltage and updated REPM output voltage; and
if the DC bus voltage and the REPM output voltage are about equal, then periodically accessing the sensor data and the component data, else reselecting and reinstructing one or more of the battery modules in combination with the power-network inverter to either source or sink power respectively to or from the DC bus.

8. The medium of claim 7, including instructions to cause the processor to perform the step of selecting one or more of the battery modules by including:
obtaining a prediction of system performance by applying the accessed sensor data and the accessed component data to a model of the energy storage system;
determining the selection of the one or more battery modules based on the system performance prediction; and
identifying the selected one or more battery modules to a first control processor in communication with each of the respective control processors.

9. The medium of claim 8, including instructions to cause the processor to perform the step of obtaining a prediction by including in the model one or more of component function characteristics, system operational functions, and a power/voltage output curve for the renewable energy power module.

10. The medium of claim 7, including instructions to cause the processor to perform the step of accessing the component data by including accessing one or more of a battery charge/discharge rate, a battery age, and a battery capacity.

11. The medium of claim 7, including instructions to cause the processor to perform the step of accessing the sensor data by including accessing one or more of a battery module output voltage and/or current, a battery condition, a battery charge level, a battery fault indication, and a power network grid status condition.

12. The medium of claim 7, including instructions to cause the processor to perform the step of accessing the sensor data by including receiving data from the sensors.

13. An energy storage system comprising:
a renewable energy power module (REPM) in electrical communication with a DC bus, the renewable energy power module configured to provide power to the DC bus;
a plurality of battery modules in electrical communication with the DC bus, each of the battery modules including a power converter, a battery, and a respective control processor;
a plurality of power network-side components including an inverter in electrical communication between the DC bus and a power network grid, and a local power-network control processor;
one or more sensors distributed in the energy storage system, respective sensors monitoring operational status of the plurality of battery modules, the renewable energy power module, the DC bus, and the power network;
each of the one or more sensors in communication with one of the respective control processors and the local power-network control processor;
a first control processor in communication with the respective control processors in the battery modules and the local power-network control processor, the first control processor in communication with a data store;

the data store including executable instructions that cause the control processor to perform a method, the method including:

accessing sensor data from sensors monitoring the energy storage system and accessing component data for one or more components of the energy storage system, the sensor data including monitored voltage of the DC bus and monitored output voltage of the REPM;

if the DC bus voltage is less than the REPM output voltage then selecting one or more battery modules from the plurality of battery modules in combination with the power-network inverter to source power to the DC bus;

else if the DC bus voltage is greater than the REPM output voltage then selecting one or more battery modules from the plurality of battery modules in combination with the power-network inverter to sink power from the DC bus;

instructing the respective control processor of each of the one or more selected battery modules and the local power-network control processor to either source or sink power respectively to or from the DC bus;

accessing updated DC bus voltage and updated REPM output voltage; and if the DC bus voltage and the REPM output voltage are about equal, then periodically accessing the sensor data and the component data, else reselecting and reinstructing one or more of the battery modules in combination with the power-network inverter to either source or sink power respectively to or from the DC bus.

14. The system of claim 13, the executable instructions causing the control processor to perform the method by including:
obtaining a prediction of system performance by applying the accessed sensor data and the accessed component data to a model of the energy storage system;
determining the selection of the one or more battery modules based on the system performance prediction; and
identifying the selected one or more battery modules to the first control processor.

15. The system of claim 14, the executable instructions causing the control processor to perform the method by including in the model one or more of component function characteristics, system operational functions, and a power/voltage output curve for the renewable energy power module.

16. The system of claim 13, the executable instructions causing the control processor to perform the method by including in the component data one or more of a battery charge/discharge rate, a battery age, and a battery capacity.

17. The system of claim 13, the executable instructions causing the control processor to perform the method by including in the sensor data one or more of a battery module output voltage and/or current, a battery condition, a battery charge level, a battery fault indication, and a power network grid status condition.

18. The system of claim 13, the executable instructions causing the control processor to perform the accessing sensor data by including receiving data from the sensors.

* * * * *